United States Patent [19]

Edwards

[11] 4,185,514
[45] Jan. 29, 1980

[54] ADAPTER FOR MOTOR-SPEED REDUCER SETS

[76] Inventor: E. David Edwards, 424 Mills St., Kalamazoo, Mich. 49001

[21] Appl. No.: 947,349

[22] Filed: Oct. 2, 1978

[51] Int. Cl.² ............................................. F16H 1/16
[52] U.S. Cl. .................................... 74/425; 74/421 A
[58] Field of Search ............... 64/4, 5; 74/421 A, 425, 74/606; 310/75 R, 75 P, 83, 89

[56] References Cited

U.S. PATENT DOCUMENTS

| 2,101,515 | 12/1937 | Schmitter | 74/421 A |
|---|---|---|---|
| 2,173,660 | 9/1939 | Perkins | 74/425 |
| 2,225,957 | 12/1940 | Korff | 74/425 X |
| 2,868,031 | 1/1959 | Schumb | 74/425 |
| 2,910,882 | 11/1959 | Wellauer | 74/606 R X |
| 3,162,061 | 12/1964 | Belezos | 74/606 R |
| 3,174,353 | 3/1965 | Gross | 74/425 X |
| 3,395,594 | 8/1968 | Blair | 74/606 R |
| 3,434,366 | 3/1969 | Raso et al. | 74/421 A |
| 4,037,429 | 7/1977 | Britzius | 64/4 |
| 4,111,069 | 9/1978 | Blair et al. | 74/421 A X |

*Primary Examiner*—Lawrence J. Staab
*Attorney, Agent, or Firm*—Blanchard, Flynn, Thiel, Boutell & Tanis

[57] ABSTRACT

A motor-speed reducer set comprising a C-flange worm gear speed reducer, an adapter connected to the speed reducer and having a drive shaft for driving the input shaft of the speed reducer, and an electric motor for driving the drive shaft of the adapter.

5 Claims, 2 Drawing Figures

ADAPTER FOR MOTOR-SPEED REDUCER SETS

BACKGROUND OF THE INVENTION

1. Field of the Invention

This invention relates to a motor-speed reducer set and, more particularly, it relates to an adapter attachable to a C-flange speed reducer and which permits the speed reducer to be driven by a motor which is separate from the speed reducer.

2. Description of the Prior Art

Worm gear, speed reducers are well-known items of industrial equipment. They are commercially available from various manufacturers, including Browning Mfg. Division of Emerson Electric Company. One type of speed reducer is identified as a C-flange, single reduction, worm gear, speed reducer. This type of speed reducer is equipped with a so-called C-flange so that a NEMA C-face electric motor can be directly attached to the speed reducer by attaching the C-end plate of the motor to the C-flange of the speed reducer whereby to provide a direct in-line drive connection from the motor shaft to the input shaft of the speed reducer. This type of motor-speed reducer set provides a fixed speed of the output shaft of the speed reducer.

There are many instances in which it is desired to drive the input shaft of the C-flange, worm gear, speed reducer from a motor which is not directly connected to the input shaft of the speed reducer. For example, it may be desired to drive the input shaft of the speed reducer by means of motors which do not have the C-face configuration. Further, it may be desired to obtain additional speed adjustment possibilities by driving the input shaft of the speed reducer at a variable speed, but without using a variable speed electric motor. It has not been possible to do this easily and conveniently for various reasons. One important reason is that the input shaft of a C-flange, worm gear, speed reducer is supported by a single bearing located at the outboard end of the shaft, and the inboard end of the input shaft is not directly supported by a bearing. Also, the inboard end of the input shaft of the speed reducer terminates within the housing of the speed reducer or within the C-flange attachment thereof so that it is difficult to provide a flexible driving connection to it.

Accordingly, it is an object of this invention to provide a motor-speed reducer set in which the electric motor is not in direct in-line connection with the input shaft of the speed reducer.

It is a further object of the invention to provide an adapter which is connectable to the C-flange of a C-flange, worm gear, speed reducer and which is drivable from an electric motor.

Additional objects of this invention will become apparent from a consideration of the following description and the attached drawings.

SUMMARY OF THE INVENTION

According to the invention, there is provided an apparatus in which the C-flange of a C-flange, worm gear, speed reducer is attached to a mating C-flange of an adapter. The adapter has a drive shaft extending therethrough and projecting from both sides thereof. One end of the adapter drive shaft projects into an axial recess in the input shaft of the speed reducer and is drivingly connected thereto. The opposite end of the shaft is drivingly connectable to an electric motor, such as by a belt and pulley connection. The adapter drive shaft is supported by two axially spaced-apart bearings located near the opposite ends of the adapter housing.

DETAILED DESCRIPTION OF THE INVENTION

Figure 1:
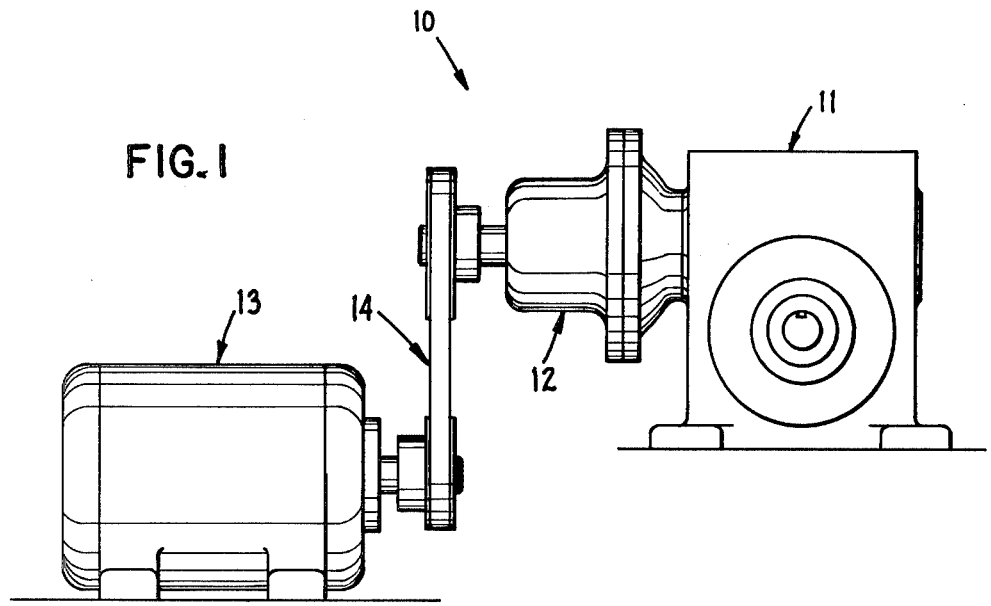
FIG. 1 is a side view of the motor-speed reducer set, according to the invention.

Referring to FIG. 1, there is shown a motor-speed reducer set 10 comprising a C-flange, single reduction, worm gear, speed reducer 11, an adapter 12 attached to the speed reducer and an electric motor 13. The motor 13 is separate from the adapter 12. The motor shaft is drivingly connected to the drive shaft of the adapter 12 by any suitable drive connection, here a belt and pulley connection 14. It is possible, therefore, to use various electric motors, including motors that do not have the C-face configuration, so that the motor-speed reducer set is not limited to use with a NEMA C-face electric motor. Moreover, the motor-speed reducer set 10 provides for adjustment of the speed of the output shaft of the reducer because the drive shaft of the adapter can be driven at variable speeds using flexible drives, such as V-belt or roller chain drives.

Figure 2:
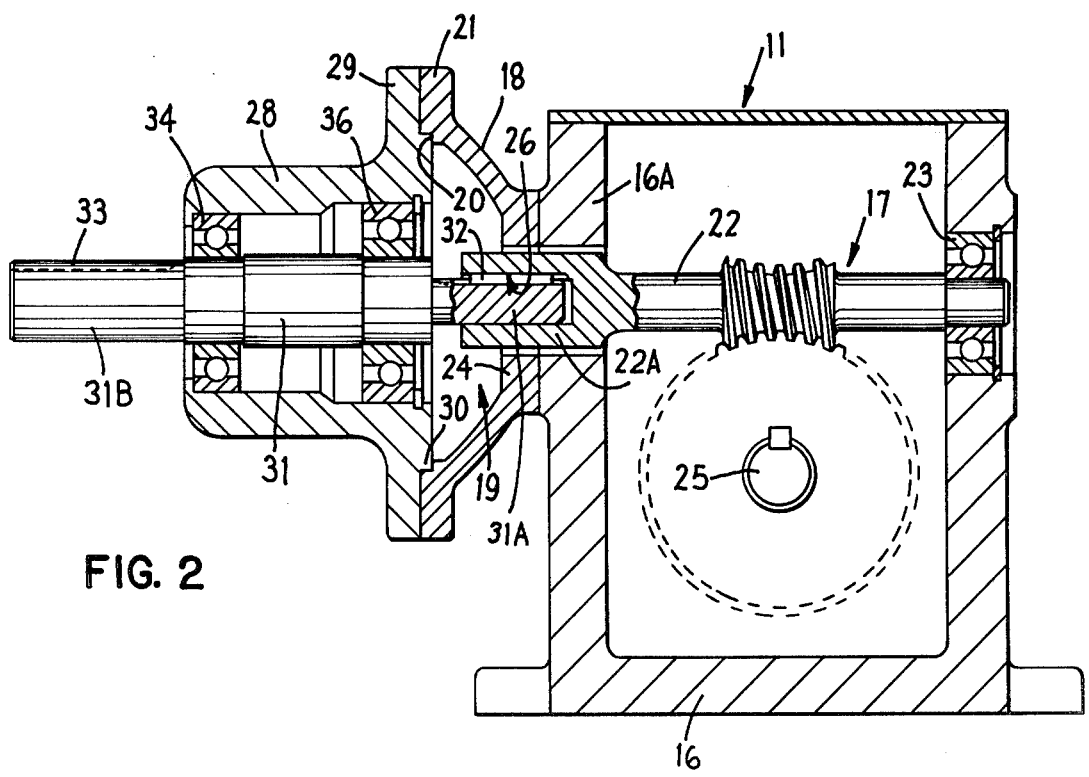
FIG. 2 is a central vertical sectional view of the adapter and the C-flange, worm gear, speed reducer.

Referring to FIG. 2, the C-flange single reduction worm gear speed reducer 11 is of conventional construction. It comprises a housing 16 having a worm and worm wheel gear set 17 therein. The C-flange attachment 18 is mounted on one side wall 16A of the housing 16. The C-flange attachment 18 is of generally concavo-convex shape and it defines an outwardly opening cavity 19 which is encircled by a radially extending circular flange 21. Inwardly from the flange 21 there is provided an annular shoulder 20 for purposes to be described hereinbelow. The flange 21 has a series of circumferentially spaced-apart bolt holes extending therethrough (not shown). The input shaft 22 of the speed reducer 11 is supported at its outboard end by a bearing 23. The inboard end 22A of the input shaft 22 is enlarged in diameter and it projects through aligned circular openings in the side wall 16A of the housing and the adjacent end wall 24 of the C-flange attachment 18, and it extends a short distance into the cavity 19. The inboard end 22A of the input shaft 22 has an elongated, coaxially extending recess 26 which opens into the cavity 19. It will be noted that the inboard end 22A of the input shaft 22 is not supported by a bearing in the speed reducer 11. The speed reducer 11 has an output shaft 25 which is driven at a reduced speed by means of the gear set 17 in a known fashion.

The adapter 12 comprises an elongated, generally cylindrical housing 28 which has a radially outwardly extending circular flange 29 at one end thereof. The housing 28 has an annular boss 30 at said one end thereof which fits snugly against shoulder 20 of the C-flange attachment. The flange 29 has a configuration such that it mates snugly with the outer end of the C-flange attachment 18 so as to extend across and close the open end of the cavity 19 therein. The flange 29 and the flange 21 have corresponding aligned holes therethrough and they are attached to each other by means of bolts which extend through the aligned holes (not shown). The adapter 12 has a drive shaft 31 extending therethrough coaxial with the input shaft 22 of the speed reducer 11. The inner (rightward) end portion 31A of the adapter drive shaft 31 is reduced in size and it extends into the recess 26 in the input shaft 22 of the speed reducer. The inner end 31A of the drive shaft 31 is drivingly connected to the speed reducer input shaft 22 in any suitable way, such as by a key and keyway assembly 32.

The outer (leftward) end 31B of the drive shaft 31 extends outside the housing 28 so that it can be provided with means to establish a driving connection with an electric motor. In the illustrated embodiment, the outer end of the drive shaft is provided with a keyway 33 so that a pulley or sprocket can be connected thereto so that the shaft 31 can be driven by a V-belt drive, or roller chain drive or similar drive connection.

The drive shaft 31 is supported by two axially spaced-apart bearings 34 and 36 which are located near the opposite axial ends of the housing 28. The inward (rightward) bearing 36 is located close to the inner end 31A of the drive shaft 31 so that the bearing 36 is effective to provide support for the inboard end of the input shaft of the speed reducer. Thus, the combination of the shafts 22 and 31, which are coaxial and drivingly connected to each other, is provided with three axially spaced-apart bearings which are effective to ensure a long useful operating life and effective operation.

The invention makes it possible to provide a variety of different driving arrangements for a conventional C-flange, single reduction, worm gear speed reducer 11 so as to expand the field of use thereof. The provision of the adapter 12 makes it possible to use a variety of different motors of different constructions, because there is no direct connection between the motor and the speed reducer. Further, whereas the combination of a C-face motor and C-flange speed reducer provides a single fixed speed of the output shaft of the speed reducer, according to the invention, adjustment of the speed of the output shaft of the speed reducer is possible owing to the fact that a V-belt or roller chain drive is provided between the adapter and the electric motor.

Although a particular preferred embodiment of the invention has been described above, the invention contemplates such changes or modifications therein as lie within the scope of the appended claims.

The embodiments of the invention in which an exclusive property or privilege is claimed are defined as follows:

1. In combination with a C-flange worm gear speed reducer comprising a housing, an output shaft, an input shaft, a worm-worm wheel gear set for driving said output shaft from said input shaft, a C-flange attachment attached to said housing, one end of said input shaft projecting through said housing into said C-flange attachment, said one end of said input shaft being free of support by a bearing and the other end of said input shaft being supported by a bearing, said one end of said input shaft having an elongated coaxially extending recess therein, said C-flange attachment having wall means defining a cavity and a radially extending annular flange surrounding the cavity and facing in a direction away from the housing; an adapter comprising an elongated cylindrical housing having a radially extending annular flange at one end thereof which flange is affixed to the annular flange of said C-flange attachment whereby said speed reducer and said adapter are rigidly secured to each other, a drive shaft extending through said adapter housing coaxial with said input shaft of said speed reducer, said drive shaft having an inboard end portion of reduced diameter extending from said one end of said adapter housing through said cavity in said C-flange attachment and into said recess in said input shaft of said speed reducer and being drivingly connected thereto, said drive shaft having an outboard end portion projecting from the other axial end of said adapter housing, and a pair of axially spaced-apart bearings mounted in said adapter housing close to the opposite axial ends of said adapter housing and rotatably supporting said drive shaft.

2. The combination of claim 1 including an electric motor and means coupling the shaft of said electric motor to said outboard end portion of said drive shaft of said adapter.

3. The combination of claim 1 including an electric motor whose shaft is offset from said drive shaft of said adapter and flexible drive means extending between and drivingly connecting said motor shaft and said drive shaft.

4. The combination of claim 3 wherein said flexible drive means comprises pulleys on said shafts and a V-belt trained on said pulleys.

5. The combination of claim 3 wherein said flexible drive means comprises sprockets on said shafts and a roller chain trained on said sprockets.

* * * * *